(12) United States Patent
Oliver et al.

(10) Patent No.: US 6,273,976 B1
(45) Date of Patent: *Aug. 14, 2001

(54) METHOD AND APPARATUS FOR TRANSPORTING A SUBSTRATE WITH ADHESIVE

(75) Inventors: Jay T. Oliver, Belton; John P. McSpedon, Temple; Wayne A. Hoelscher, Rogers; William R. Schumann, Troy, all of TX (US)

(73) Assignee: Premark RWP Holdings, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,468

(22) Filed: Aug. 7, 1998

(51) Int. Cl.[7] .................................................. C09J 7/00
(52) U.S. Cl. ........................ 156/3.3; 118/227; 118/503; 156/563
(58) Field of Search .................. 156/3.3, 563; 118/227, 118/503

(56) References Cited

U.S. PATENT DOCUMENTS

| | | | |
|---|---|---|---|
| 3,492,182 | 1/1970 | Howard | 156/230 |
| 3,895,984 | 7/1975 | Cone et al. | 156/79 |
| 4,177,101 | * 12/1979 | Evans | 156/313 |
| 4,288,274 | 9/1981 | Holz | 156/364 |
| 4,986,873 | 1/1991 | Hamamura | 156/552 |

FOREIGN PATENT DOCUMENTS 970232   7/1997   (IE) .

* cited by examiner

*Primary Examiner*—John J. Gallagher
(74) *Attorney, Agent, or Firm*—Welsh & Flaxman LLC (57) ABSTRACT

An apparatus is disclosed for transporting panel substrates with adhesive on both sides such that the panel substrates may be used in the manufacture of decorative panels. The apparatus includes a adhesive applicator which coats a panel substrate with adhesive. The apparatus also includes a first edge support member and a second edge support member located adjacent an outlet end of the adhesive applicator such that edges of the panel substrate are respectively supported by the first edge support member and the second edge support member without interfering with the adhesive being applied to the panel substrate. The apparatus further includes a support for selectively supporting the coated panel substrate and releasing the panel substrate while only contacting edges of the panel substrate so as not to substantially interfere with the adhesive applied to the panel substrate by the adhesive applicator. A method for manufacturing a panel is also disclosed.

20 Claims, 10 Drawing Sheets

METHOD AND APPARATUS FOR TRANSPORTING A SUBSTRATE WITH ADHESIVE

BACKGROUND OF THE INVENTION

1. Field of the Invention

The invention relates to a method and apparatus for fabricating a laminated panel. More particularly, the invention relates to a method and apparatus for transporting panel substrates with adhesive on both sides such that the panel substrates may be used in the manufacture of multi-layer decorative panels.

2. Description of the Prior Art

Furniture, desks, partitions, flooring decorative surface and other decorative structures are often constructed from decorative panels. These panels are commonly composed of a central substrate with decorative laminates bonded to opposite sides of a central panel substrate. For example, a wood grain panel is constructed by applying wood grain laminates to opposite sides of a particle board substrate.

When the decorative laminates bonded to the substrate are relatively thick, the manner in which adhesive is applied to the substrate is of little consequence. Specifically, the thickness of the decorative laminates hides any irregularities in the adhesive bonding the substrate and decorative laminate.

However, as the thickness of the decorative laminates decreases it becomes very important to ensure that the adhesive layer contains no undesirable irregularities. Because of the thinness of such decorative laminates, any irregularities may show through or effect the decorative laminate in an undesirable manner. While the term decorative laminates is used above to discuss the prior art, it should be understood by those of ordinary skill in the art that the decorative surfacing layer, for example, the decorative laminate, may take various forms.

The present invention allows for the handling of a substrate which has been treated with adhesive on both sides without disturbing the adhesive coating. In this way, the present invention overcomes the shortcomings of prior art devices employing conveyor rollers or chains that necessarily contact one side of the adhesive coated substrate in order to transport it.

SUMMARY OF THE INVENTION

It is, therefore, an object of the present invention to provide an apparatus for transporting panel substrates with adhesive on both sides such that the panel substrates may be used in the manufacture of decorative panels. The apparatus includes an adhesive applicator which coats a panel substrate with adhesive. The apparatus also includes a first edge support member and a second edge support member located adjacent an outlet end of the adhesive applicator such that edges of the panel substrate are respectively supported by the first edge support member and the second edge support member without interfering with the adhesive being applied to the panel substrate. The apparatus further includes a support for selectively supporting the coated panel substrate and releasing the panel substrate so as not to substantially interfere with the adhesive applied to the panel substrate by the adhesive applicator.

It is also an object of the present invention to provide an apparatus wherein the adhesive applicator coats opposite sides of the panel substrate.

It is a further object of the present invention to provide an apparatus wherein the first edge support member and the second edge support member are selectively mounted to accommodate panel substrates of different widths.

It is another object of the present invention to provide an apparatus wherein the first edge support member and the second edge support member are angled so as to contact only the edges of the panel substrate.

It is also an object of the present invention to provide an apparatus wherein the first edge support member and the second edge support member include rollers which contact the edges of the panel substrate.

It is a further object of the present invention to provide an apparatus including additional pairs of edge support members.

It is also an object of the present invention to provide an apparatus wherein the support includes a static support having a recess for accommodating a surfacing material adapted to be bonded to the panel substrate.

It is another object of the present invention to provide an apparatus wherein the support includes a static support and a release support lip, and the static support and the release support lip selectively support the panel substrate.

It is also an object of the present invention to provide an apparatus wherein the release support lip selectively rotates to release the panel substrate.

It is a further object of the present invention to provide an apparatus wherein the support includes a static support and a roller trolley assembly, and the static support and the roller trolley assembly selectively support the panel substrate.

It is another object of the present invention to provide an apparatus wherein the roller trolley assembly selectively moves to release the panel substrate.

It is a further object of the present invention to provide an apparatus wherein the roller trolley assembly includes a first set of rollers and a second set of rollers oriented to engage opposite edges of the panel substrate.

It is another object of the present invention to provide an apparatus wherein the first set of rollers and the second set of roller are angled so as to contact only the edges of the panel substrate.

It is also an object of the present invention to provide a method for manufacturing a panel. The method includes applying adhesive to at least one side of a panel substrate, supporting the panel substrate with edge support members such that the edge support members do not interfere with the adhesive applied to the at least one side of the panel substrate, moving the panel substrate to a selective support system, suspending the panel substrate over a piece of surfacing material, and releasing the panel substrate down onto the surfacing material such that adhesive on the panel substrate contacts the surfacing material.

It is a further object of the present invention to provide a method including the step of applying a top surfacing material to an opposite side of the panel substrate.

It is another object of the present invention to provide a method including the step of bonding the formed panel.

It is also an object of the present invention to provide a method wherein the step of applying includes applying adhesive to opposite sides of the panel substrate.

It is a further object of the present invention to provide a method including the step of applying a top surfacing material to an opposite side of the panel substrate.

It is another object of the present invention to provide a method wherein the step of releasing includes releasing a first end of the panel substrate onto the surfacing material.

It is also an object of the present invention to provide a method wherein the surfacing material is supported by a conveyor.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figures 1, 2:
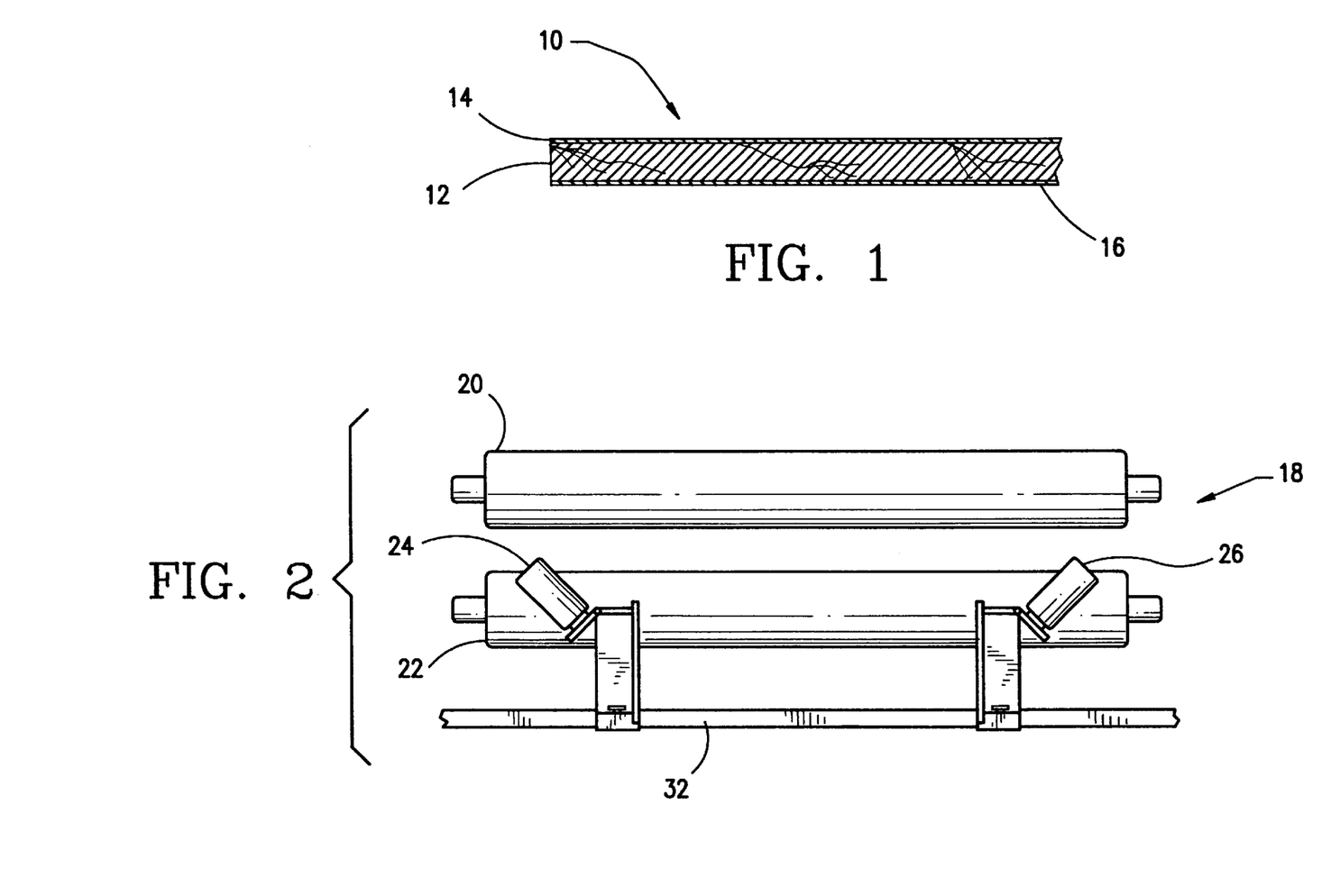
FIG. 1 is a cross-sectional view of a decorative panel manufactured in accordance with the present invention.
FIG. 2 is an end view of the present apparatus showing the adhesive applicator rollers and the edge support rollers.

With reference to FIG. 1, a decorative panel 10 manufactured in accordance with the present invention is disclosed. The decorative panel 10 includes a panel substrate 12 with top and bottom decorative surfacing materials 14, 16 applied to opposite sides of the panel substrate 12. The panel substrate 12 is preferably fiberboard, chip board, particle board, foam, or any other material commonly employed as a substrate. The decorative surfacing materials 14, 16 are preferably decorative laminate skins commonly employed in a wide variety of applications, although other decorative surfacing materials known to those of ordinary skill in the art may be used without departing from the spirit of the present invention.

Ultimately, it is envisioned that such three layer decorative panels may be used in the construction of furniture, desks, partitions, flooring or a wide variety of other structures in which decorative laminates are commonly employed. In addition, it should be understood by those of ordinary skill in the art that the present invention is not limited to three layer decorative panels, and panels of various layers may be manufactured without departing from the spirit of the present invention.

An apparatus 18 in accordance with the present invention is disclosed in FIGS. 2–8. The apparatus 18 is designed for transporting panel substrates 12 with adhesive on both sides such that the panel substrates 12 may be used in the manufacture of decorative panels. Briefly, the apparatus 18 permits the simultaneous coating of opposite sides of a panel substrate 12 such that top and bottom decorative surfacing materials 14, 16 may be applied to the respective opposite sides of the panel substrate 12 to form a three layer decorative panel 10.

With this in mind, the apparatus 18 includes a pair of adhesive applicator rollers 20, 22 which apply adhesive to opposite sides of the central panel substrate 12. The adhesive applicator rollers 20, 22 are conventional rollers used in simultaneously applying adhesive to opposite sides of a panel substrate 12, and various adhesive application devices may be employed without departing from the spirit of the present invention. As the panel substrate 12 exits the adhesive applicator rollers 20, 22, its top and bottom sides are coated with adhesive in a predetermined manner and contact with the top and bottom sides is highly undesirable.

A first edge support roller 24 and a second edge support roller 26 are accordingly located adjacent the outlet end 28 of the adhesive applicator such that edges 30 of the panel substrate 12 are respectively supported by the first edge support roller 24 and the second edge support roller 26. The first and second edge support rollers 24, 26 are selectively mounted to a support assembly 32 such that the distance between the first and second edge support rollers 24, 26 may be adjusted to accommodate panel substrates 12 of varying widths.

Figure 3:
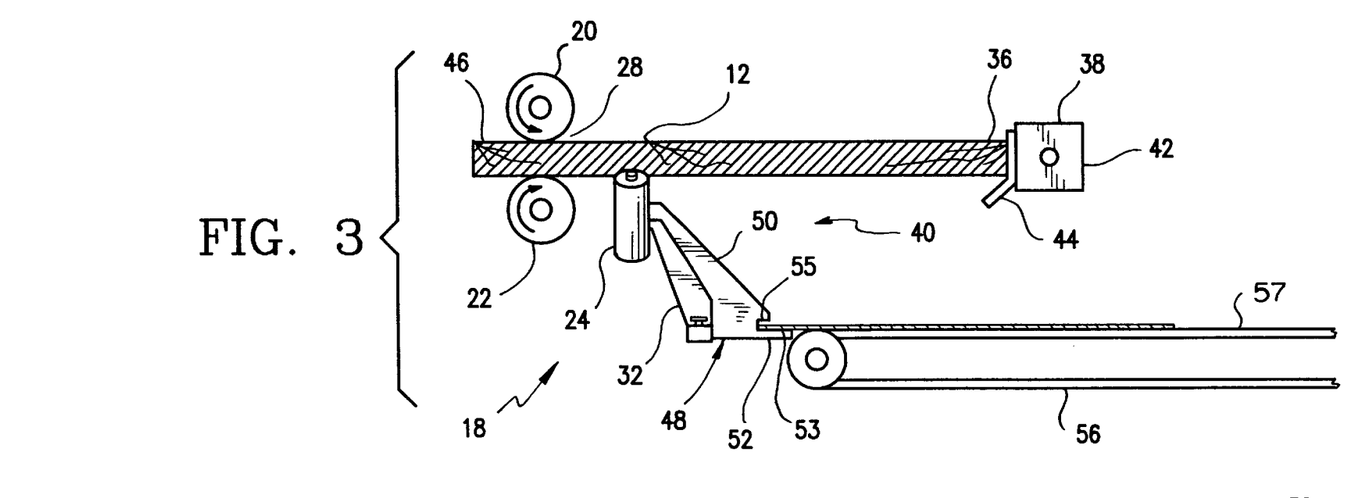
FIG. 3 is a side view of the present apparatus during the coating of the panel substrate.
Figure 3A:
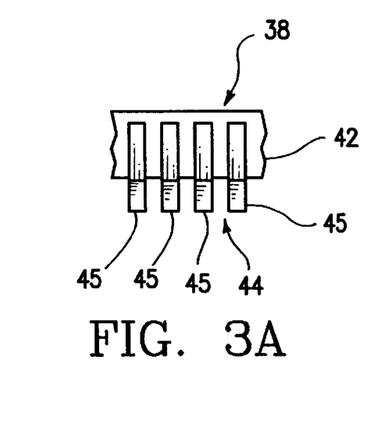
FIG. 3A is a front plan view of the release support lip.
Figure 4:
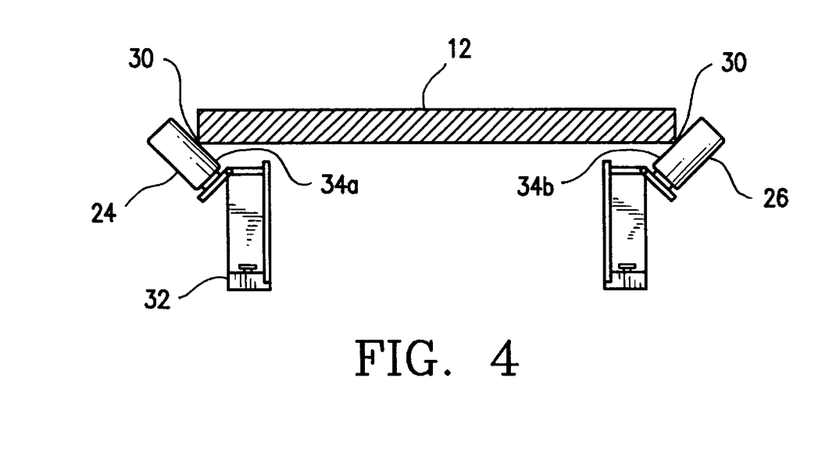
FIG. 4 is an end view showing the panel substrate supported by the edges of the support roller.

The first and second edge support rollers 24, 26 are oriented such that the surface of the rollers 34a, 34b only contacts the edges 30 of the panel substrate 12 and does not interfere with the adhesive applied to the opposite sides of the panel substrate 12. Specifically, the first and second edge support rollers 24, 26 are angled so as to contact only the edges 30 of the panel substrate 12. The first edge support roller 24 and the second edge support roller 26 are preferably oriented at approximately a 45° angle, although other angular orientation may be employed without departing from the spirit of the present invention. By angling the first and second support rollers 24, 26, only the edges 30 of the panel substrate 12 are contacted as the panel substrate 12 is supported while it moves from the outlet end 28 of the adhesive applicator rollers 20, 22 as best seen in FIGS. 3 and 4.

Figure 5:
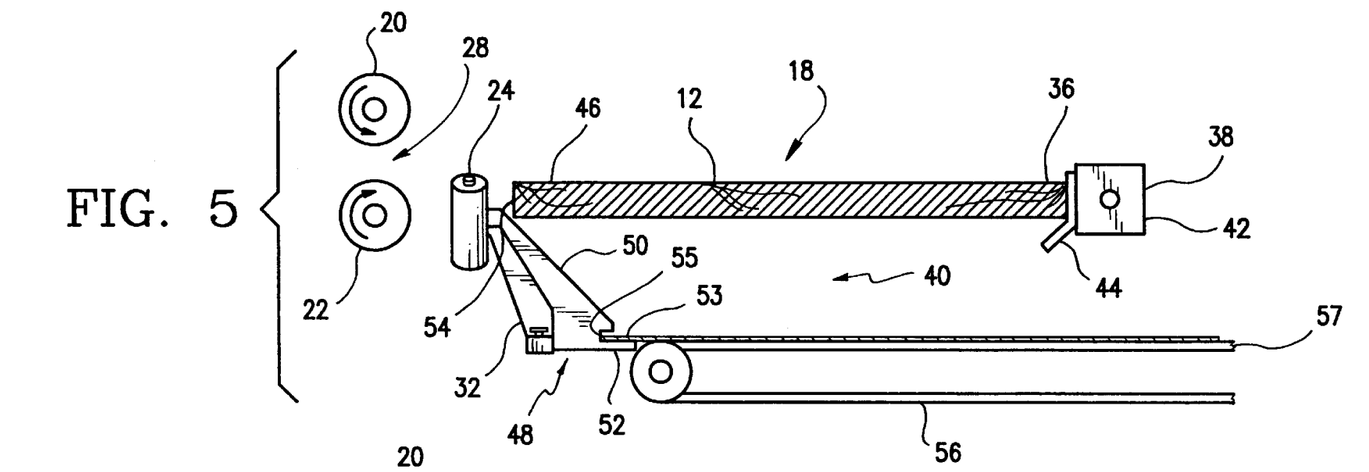
FIG. 5 is a side view of the present apparatus with the panel substrates supported by the support assembly.
Figure 6:
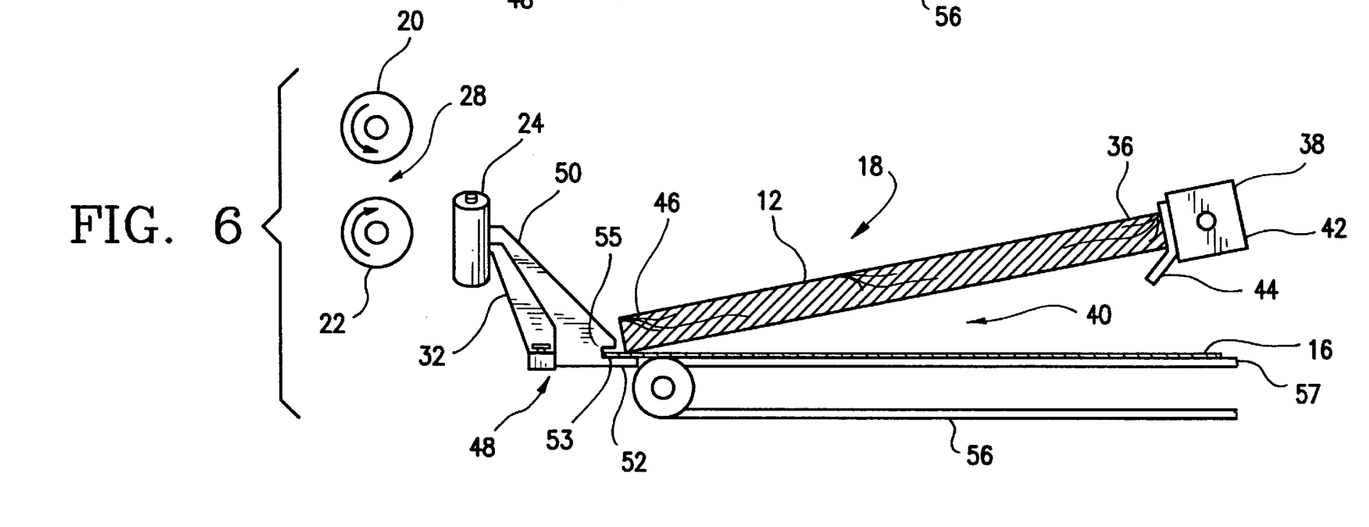
FIG. 6 is a side view of the present apparatus with the panel substrate suspended by the lip member and the release support lip.

As the panel substrate 12 moves from the adhesive applicator roller 20, 22, the first end 36 of the panel substrate 12 contacts a release support lip 38 of the support assembly 40. The release support lip 38 includes a support member 42 with a lip member 44 secured thereto. The lip member 44 is preferably composed of plural finger-like projections 45 extending from the support member 42 (see FIG. 3A). As shown in FIGS. 3, 5 and 6, the lip member 44 is shaped to support the first end 36 of the substrate panel 12. The lip member 44 is formed with an angular orientation of approximately 135° such that the release support lip 38 only contacts the edge 30 of the first end 36 of the panel substrate 12. In this way, the release support lip 38 does not interfere with the adhesive applied to the underside of the panel substrate 12.

The release support lip 38 is mounted (not shown) for rotational and longitudinal movement. Movement of the release support lip 38 is controlled by the operator and the release support lip 38 is caused to move rearwardly to support the first end 36 of the panel substrate 12 as the panel substrate 12 moves from the adhesive applicator rollers 20, 22. When the second end 46 of the panel substrate 12 moves beyond the first and second edge support rollers 24, 26, the second end 46 of the panel substrate 12 is permitted to slide on the static support 48.

With reference to FIGS. 3, 5, 6, and 7, the static support 48 is positioned adjacent the end of the conveyor 56 for reasons that will become apparent from the following disclosure. The static support 48 includes an angled member 50 and a lip member 52. The angled member 50 supports the second end 46 of the panel substrate 12 as it is released by the first and second edge support rollers 24, 26. The angled orientation of the angled member 50 permits the static support 48 to engage only the edge 30 of the second end 54 of the panel substrate 12. The released panel substrate 12 then slides down the angled member 50 as the release support lip 38 moves rearwardly under the control of the operator. When the second end 46 of the panel substrate 12 reaches the lip member 52, the operator ceases the rearward movement of the release support lip 38.

The top surface 53 of the lip member 52 is aligned with the top surface 57 of the conveyor 56 such that the bottom decorative surfacing material 16 may be placed on the lip member 52, and within a recess 55 formed in the lip member 52, while it sits on the conveyor 56. The recess 55 is shaped to receive the bottom decorative surfacing material 16 such that the second end 54 of the panel substrate 12 sits upon the bottom decorative surfacing material 16 when the second end 54 of the panel substrate 12 reaches the lip member 52.

At this point, the adhesive coated panel substrate 12 is substantially suspended over the conveyor 56 on which the bottom decorative surfacing material 16 is positioned, with only the second end 54 of the panel substrate 12 touching the decorative surfacing material 16. When the operator determines that the bottom decorative surfacing material 16 is properly positioned below the suspended panel substrate 12, the operator selectively releases the panel substrate 12 to contact the bottom decorative surfacing material 16.

Figure 7:
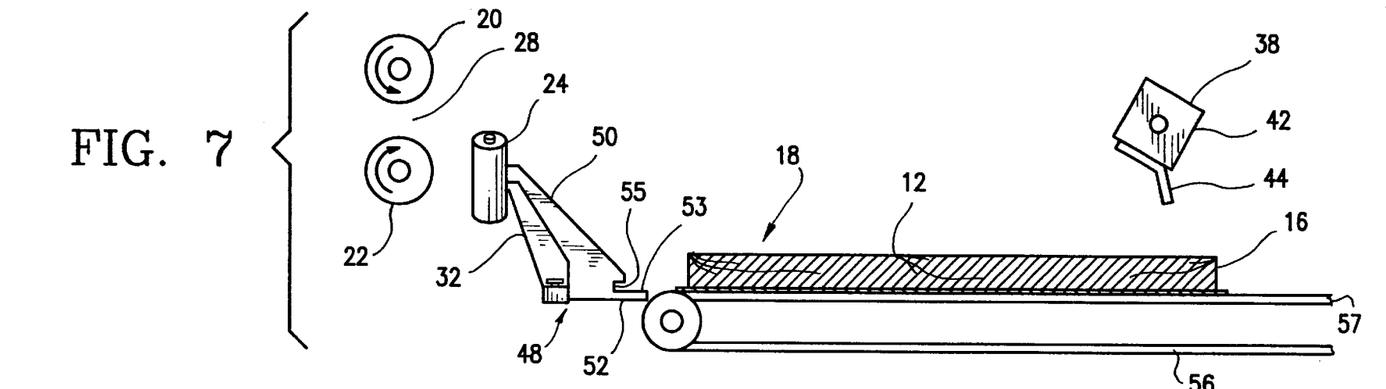
FIG. 7 is a side view of the present apparatus with the panel substrate released onto a bottom decorative surfacing material positioned on a conveyor.
Figure 8:
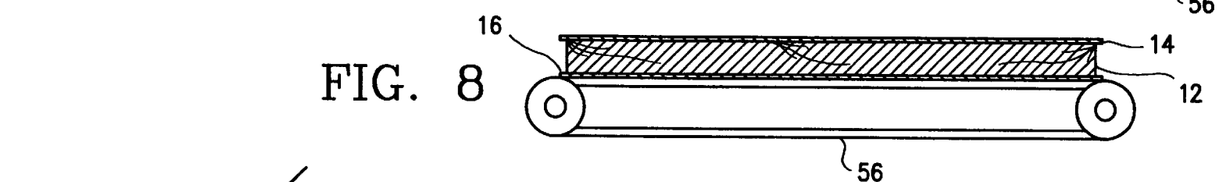
FIG. 8 is a side view of the top decorative surfacing material applied while the panel remains on the conveyor.

Specifically, and with reference to FIGS. 6 and 7, the release support lip 38 is rotated to drop the first end 36 of the panel substrate 12 onto the bottom decorative surfacing material 16 such that the adhesive on the panel substrate 12 contacts the bottom decorative surfacing material 16. The conveyor 56 is then used to moved the bottom decorative surfacing material 16 from within the recess 55 and a top decorative surfacing material 14 is applied to the top side of the panel substrate 12 as shown in FIG. 8. The top decorative surfacing material 14 is manually applied to the panel substrate 12 by laying it on top of the panel substrate 12 and properly positioning it thereon. The three layer decorative panel 10 is then moved along the conveyor 56 to a bonding press where the decorative panel 10 is bonded in a predetermined manner.

As those of ordinary skill in the art will appreciate, the bonding process may be varied to suit particular materials without departing from the spirit of the present invention. It should also be appreciated by those of ordinary skill in the art that the top and bottom decorative surfacing materials 14, 16 need not align with the panel substrate 12 perfectly. The edges of the completed panel are trimmed during final processing and any misalignment is compensated for at that time. In fact, the slight overhang created by the placement of the bottom decorative surfacing material 16 within the recess 55 allows any adhesive drips to be caught on the bottom decorative surfacing material 16.

Figure 9:
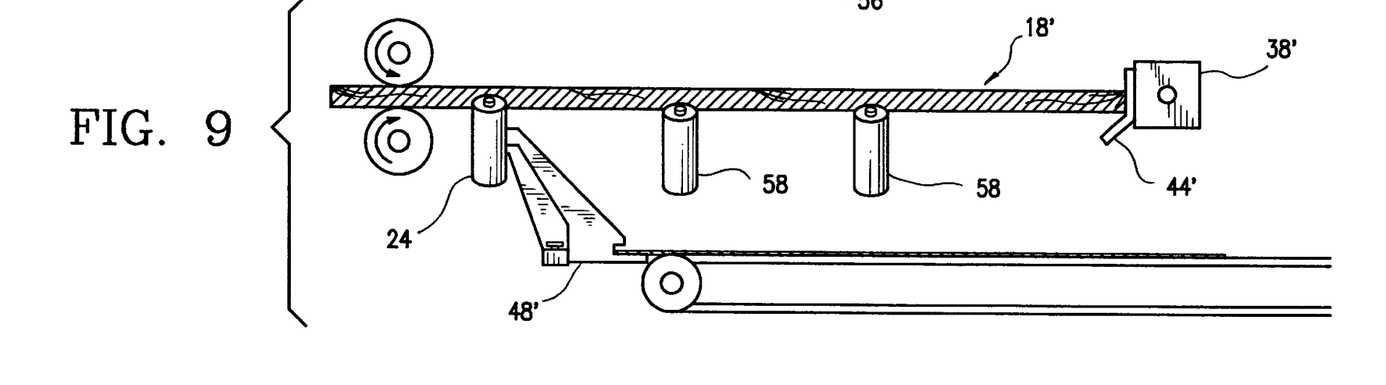
FIGS. 9 and 10 are respectively a side view and an end view of an alternate embodiment employing multiple pairs of edge support rollers.
Figure 10:
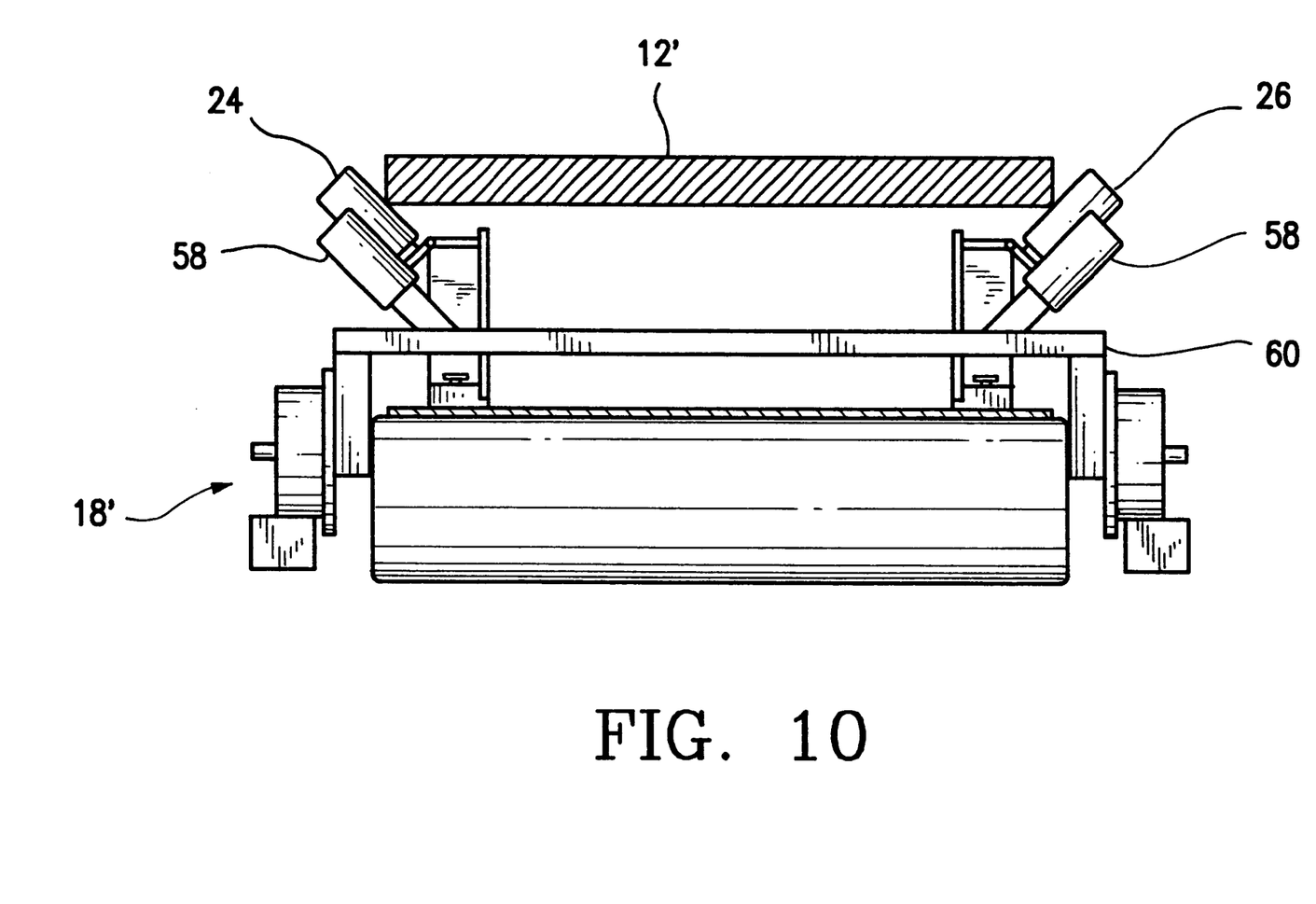
Figure 11:
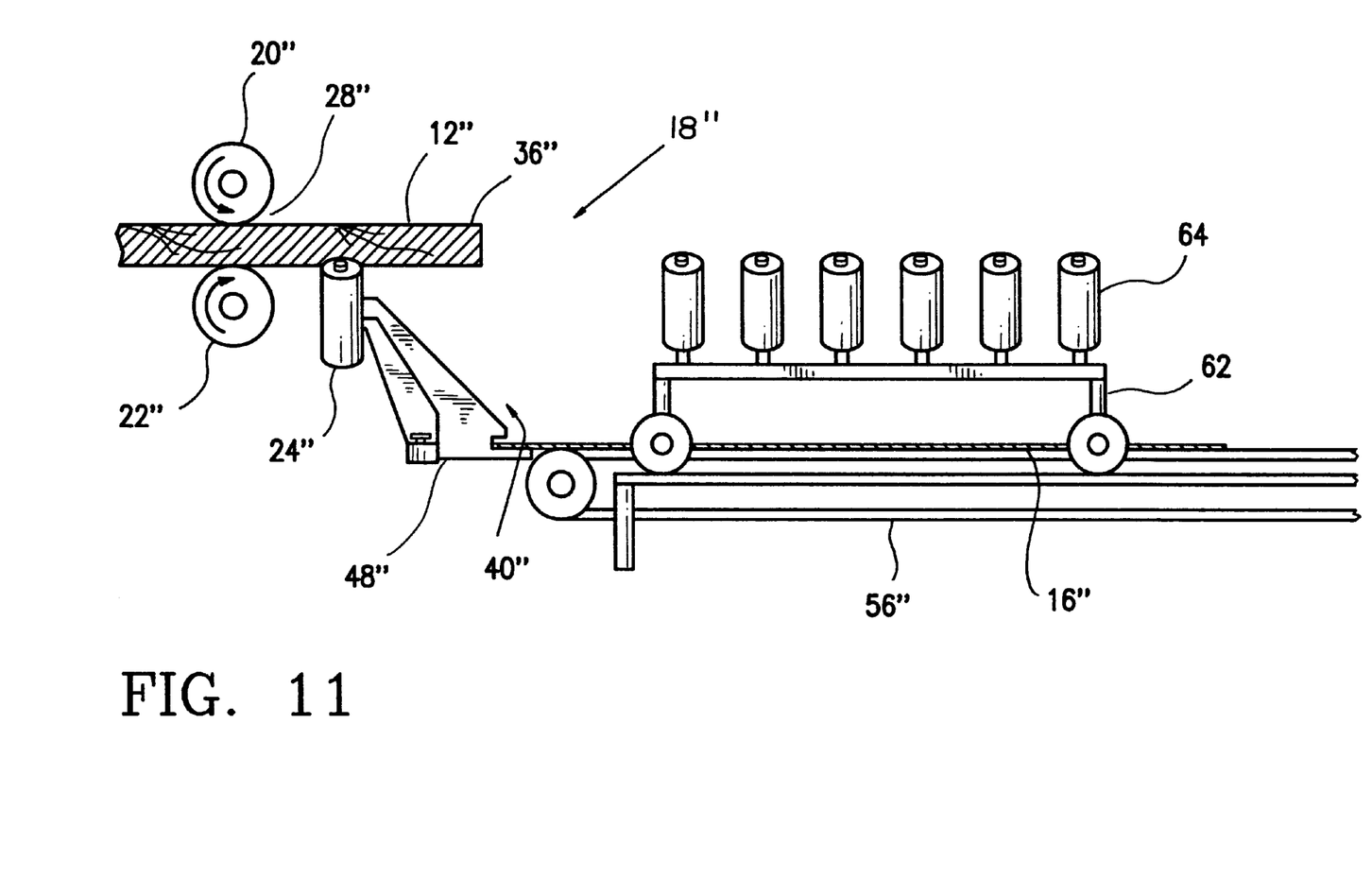
FIGS. 11–15 are side views of a further embodiment of the present invention.
Figure 12:
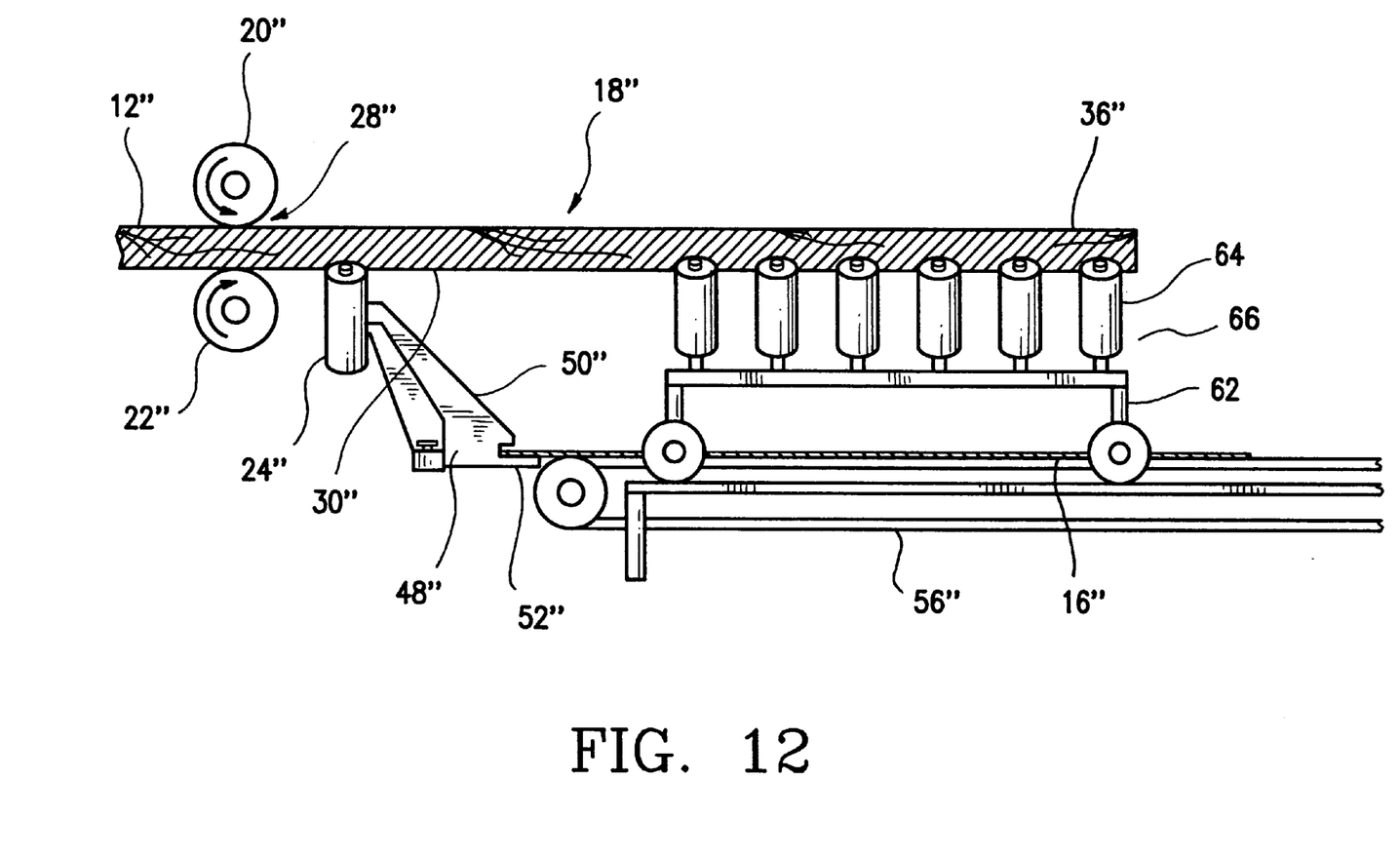
Figure 13:
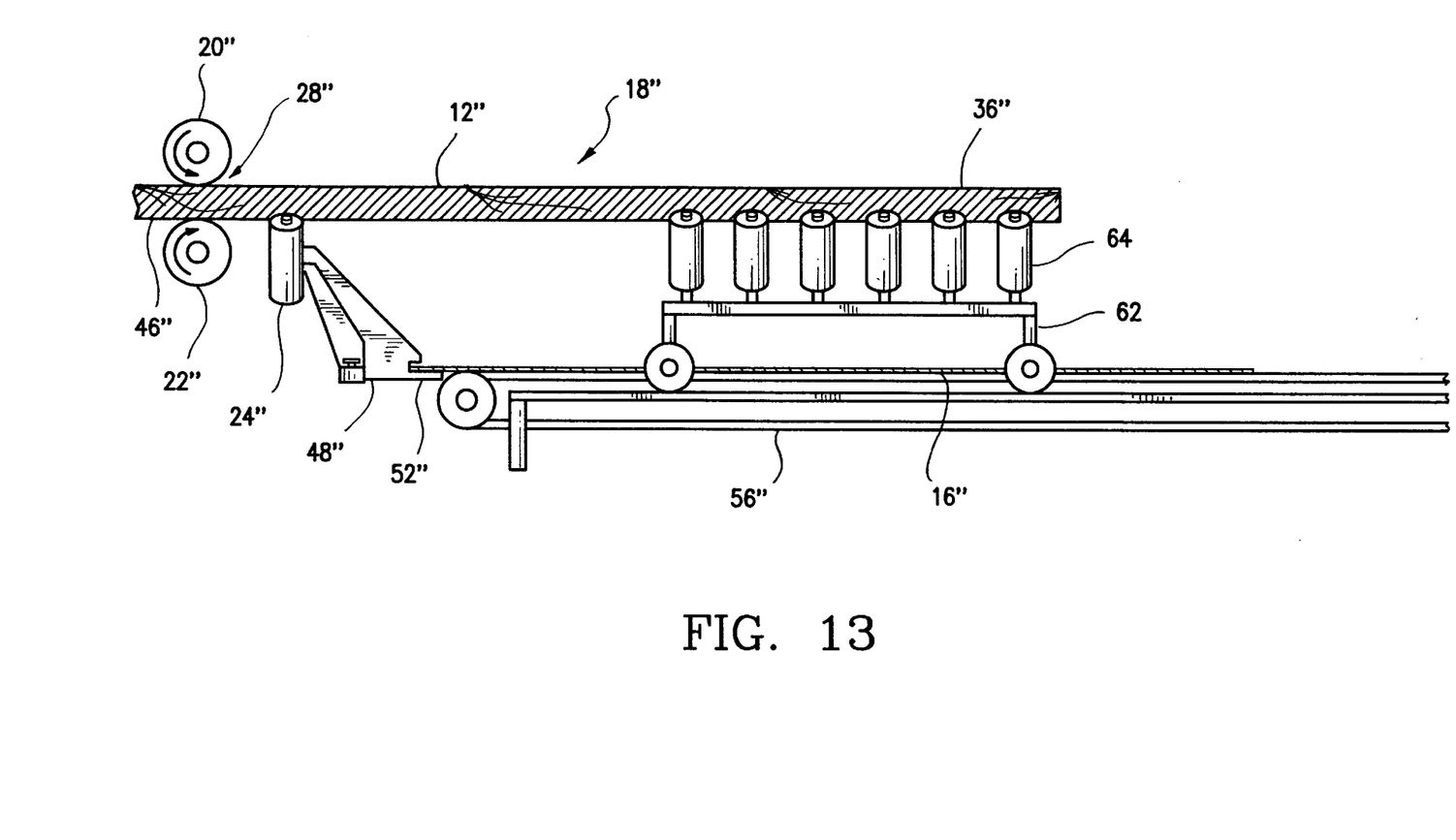
Figure 14:
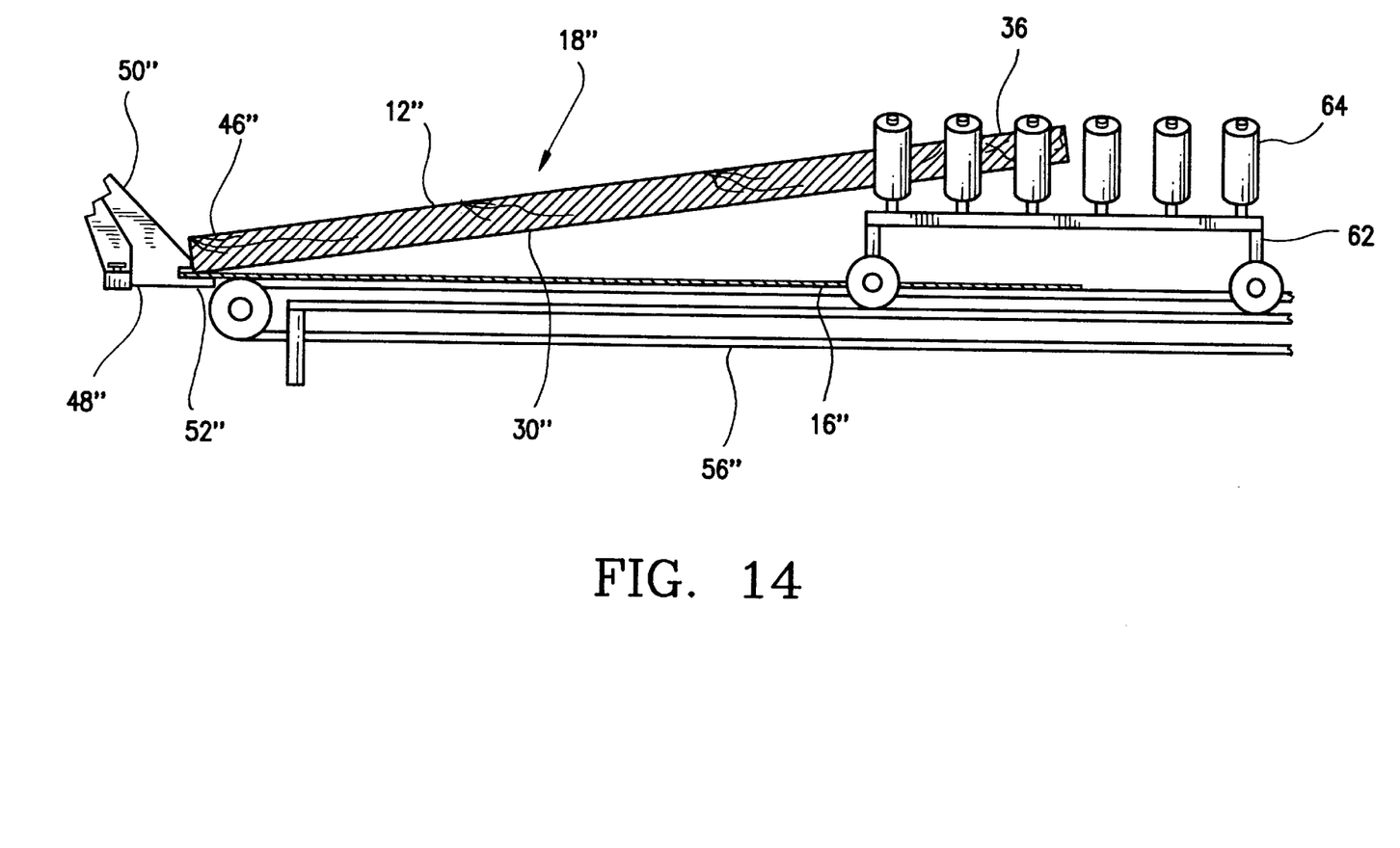

As those of ordinary skill in the art will certainly appreciate, thin panel substrates 12' often present a problem with regard to their flexibility. With this in mind, and with reference to FIGS. 9 and 10, the present apparatus 18' may be modified to include additional edge support rollers 58 positioned adjacent the first and second edge support rollers 24', 26'. The additional edge support rollers 58 provide further support to the panel substrate 12' as it is supported between the rollers 24', 26' and the release support lip 38'.

In order to allow the panel substrate 12' to drop down upon the static support 48', the additional rollers 58 are mounted upon a support assembly 60 which will move under the control of an operator to facilitate the release of the panel substrate 12' onto the static support 48' in the manner discussed above with regard to FIGS. 2 through 8. The support assembly 60' may roll the additional rollers from their support position, or an alternate support assembly may be employed which rotates the additional rollers 58 from their position below the panel substrate 12.

An alternate embodiment 18" of the present invention is disclosed in FIGS. 11 through 15. The alternate embodiment 18" is substantially the same as the embodiments disclosed in FIGS. 2 through 10, however, the release support lip 38 is replaced with a roller trolley assembly 62. The roller trolley assembly 62 includes a first set of rollers 64 and a second set of rollers (not shown) oriented to engage opposite edges 30" of the panel substrate 12" without interfering with the adhesive applied to the panel substrate 12". As with the release support lip 38, the roller trolley assembly 62 moves longitudinally under the control of the operator relative to the panel substrate 12" as the panel substrate 12" moves from the outlet 28" of the adhesive applicator rollers 20", 22".

As with the first and second edge support rollers 24", 26", the first set of rollers 64 and the second set of roller are angled so as to contact only the edges 30" of the panel substrate 12". Preferably, the first set of rollers 64 and the second set of rollers are oriented at 45° angle, although other angular orientations may be employed without departing from the spirit of the present invention.

In use, the first end 36" of the panel substrate 12" contacts the roller trolley assembly 62 of the support assembly 40" as the panel substrate 12" moves away from the adhesive applicator roller 20", 22". Once the first end 36" of the panel substrate 12" moves beyond the end 66 of the roller trolley assembly 62 (see FIG. 12), the operator moves the roller trolley assembly 62 rearwardly with the panel substrate 12" such that the first end 36" of the panel substrate 12" is fully supported as the panel substrate 12" moves from the adhesive applicator roller 20", 22". When the second end 46" of the panel substrate 12" moves beyond the first and second edge support rollers 24", 26", the second end 46" of the panel substrate 12" is permitted to slide onto the static support 48". The released panel substrate 12" then slides down the angled member 50" of the static support 48" and the roller trolley assembly 62 continues to move rearwardly.

Figure 15:
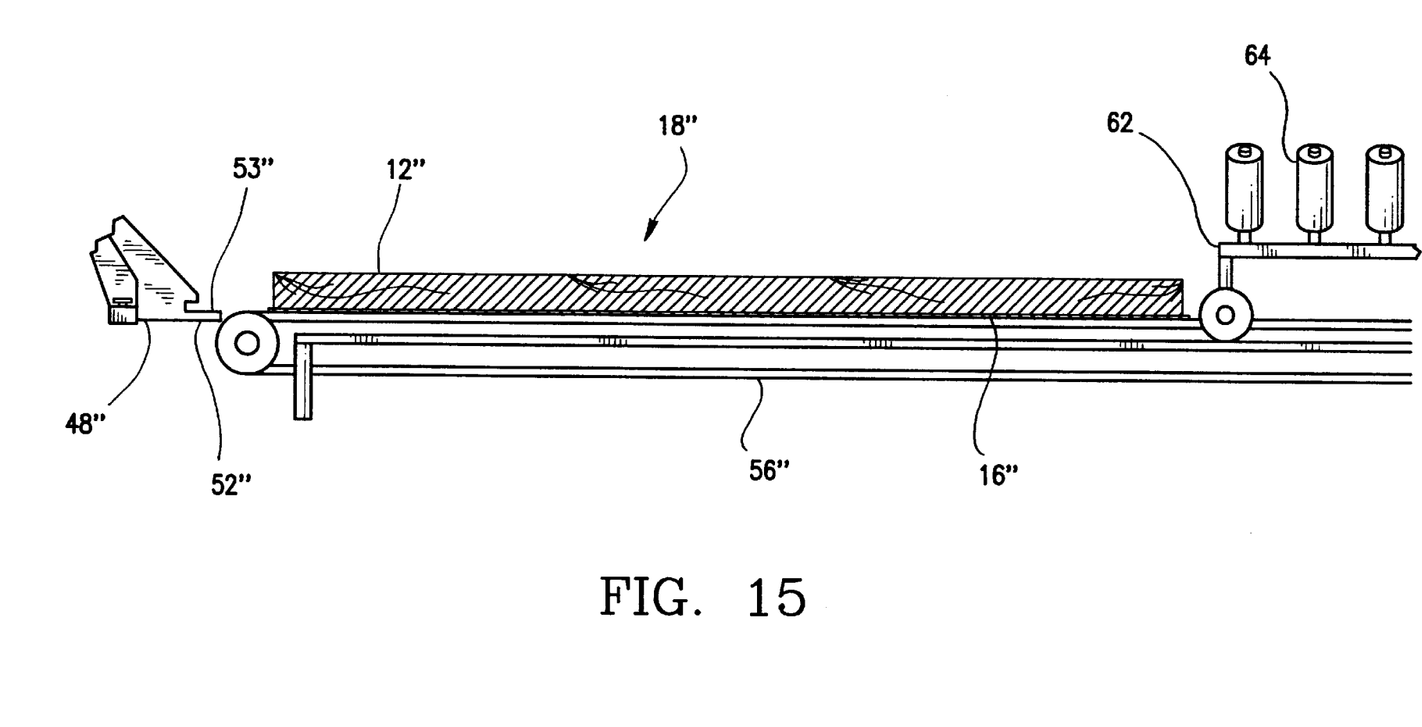

When the second end 46" of the panel substrate 12" slides down and contacts the bottom decorative surfacing material held in the lip member 52" of the static support 48", the roller trolley assembly 62 ceases its rearward movement. At this point, the coated panel substrate 12" is substantially suspended over the conveyor 56" on which the bottom decorative surfacing material 16" is positioned. When the operator determines that the bottom decorative surfacing material 16" is properly positioned below the suspended panel substrate 12", the operator selectively moves the roller trolley assembly 62 rearwardly to drop the first end 36" of the panel substrate 12" onto the bottom laminate 16" such that the adhesive on the panel substrate 12" contacts the bottom decorative surfacing material 16".

Summarizing the present method for manufacturing a laminated panel, the panel substrate is first coated with adhesive by applying the adhesive to opposite sides of the panel substrate with adhesive applicator rollers (see FIGS. 3, 9, 11, 12 and 13). The panel substrate is then supported by edge support rollers such that the edge support rollers do not interfere with the adhesive applied to the opposite sides of the panel substrate (see FIGS. 3, 4, 9, 11, 12 and 13). The panel substrate is then moved to a selective support system, wherein the support system is configured to minimize contact with the panel substrate so as not to interfere with the adhesive applied to the support sides of the panel substrate (see FIGS. 5, 6 and 14). While engaging the support system, the panel substrate is substantially suspended over a conveyor that holds a piece of decorative surfacing material. The panel substrate is then released down onto the skin such that the adhesive on the panel substrate contacts the bottom decorative surfacing material (see FIGS. 7 and 15). Finally, the top laminate is applied to the top side of the panel substrate (see FIG. 8) and the entire structure is bonded to complete the construction of the three layer panel assembly.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. An apparatus for transporting panel substrates with adhesive on both sides such that the panel substrates may be used in the manufacture of decorative panels, the apparatus comprising:
   an adhesive applicator which coats a panel substrate with adhesive;
   a first edge support member and a second edge support member located adjacent an outlet end of the adhesive applicator such that opposed edges of the panel substrate are respectively supported by the first edge support member and the second edge support member without interfering with the adhesive being applied to the panel substrate; and
   a support for selectively supporting the coated panel substrate and releasing the panel substrate so as not to interfere with the adhesive applied to the panel substrate by the adhesive applicator, the support including a static member positioned adjacent to the outlet end of the adhesive applicator and oriented to support a trailing edge of the panel substrate, the trailing edge being transverse to the opposed edges, as the coated panel moves between the outlet end of the adhesive applicator and a lower supporting surface, the static member including an angled member substantially extending between the outlet end of the adhesive applicator and the lower support surface for downwardly guiding the coated panel upon release.

2. The apparatus according to claim 1, wherein the first edge support member and the second edge support member are selectively mounted to accommodate panel substrates of different widths.

3. The apparatus according to claim 1, wherein the first edge support member and the second edge support member are angled so as to contact only the edges of the panel substrate.

4. The apparatus according to claim 1, wherein the first edge support member and the second edge support member include angled rollers which contact the edges of the panel substrate.

5. The apparatus according to claim 4, further including additional pairs of edge support rollers.

6. The apparatus according to claim 1, wherein the static support has a recess for accommodating a decorative surfacing material adapted to be bonded to the panel substrate.

7. The apparatus according to claim 1, wherein the support further includes a release support lip adapted for supporting a leading edge of the panel substrate, which leading edge is substantially transverse to the opposed edges, as the panel substrate exits the outlet end of the adhesive applicator, the release support lip moving longitudinally with the panel substrate as the panel substrate moves from the outlet end of the adhesive applicator, wherein the released the release support lip moves from the outlet end of the adhesive applicator to guide the panel substrate for subsequent release upon a lower support surface.

8. The apparatus according to claim 7, wherein the release support lip selectively rotates to release the panel substrate.

9. The apparatus according to claim 1, wherein the support further includes a roller trolley assembly, and the static support and the roller trolley assembly selectively support the panel substrate.

10. The apparatus according to claim 9, wherein the roller trolley assembly selectively moves to release the panel substrate.

11. The apparatus according to claim 9, wherein the roller trolley assembly includes a first set of angled rollers and a second set of angled rollers oriented to engage opposite edges of the panel substrate.

12. A method for manufacturing a panel, comprising the following steps:
   applying adhesive to at least one side of a panel substrate;
   supporting the opposed edges of the panel substrate with edge support members such that the edge support members do not interfere with the adhesive applied to the at least one side of the panel substrate;
   moving the panel substrate to a selective support system, the support system including a static support oriented to support a trailing edge of the panel substrate after the step of applying adhesive, the trailing edge of the panel substrate being transverse to the opposed edges, and a release support lip oriented to support a leading edge of the panel substrate, which leading edge is substantially transverse to the opposed edges, after the step of applying adhesive;
   guiding the panel substrate to a desired position, the step of guiding including longitudinally moving the release support lip as the panel substrate moves from the outlet end of the adhesive applicator to guide the substrate panel for subsequent release upon a lower support surface;
   suspending the panel substrate over a piece of surfacing material; and
   releasing the panel substrate down onto the surfacing material such that adhesive on the panel substrate contacts the surfacing material, wherein upon release of the panel substrate an angled member of the static support guides the trailing end of panel substrate into contact with the surfacing material.

13. The method according to claim 12, further including the step of applying a top surfacing material to an opposite side of the panel substrate.

14. The method according to claim 12, further including the step of bonding the formed panel.

15. The method according to claim 12, wherein the step of applying includes applying adhesive to opposite sides of the panel substrate.

16. The method according to claim 15, further including the step of applying a top surfacing material to an opposite side of the panel substrate.

17. The method according to claim 12, wherein the step of releasing includes releasing a first end of the panel substrate onto the surfacing material.

18. The method according to claim 12, wherein the surfacing material is supported by a conveyor.

19. An apparatus for transporting panel substrates with adhesive on both sides such that the panel substrates may be used in the manufacture of decorative panels, the apparatus comprising:

an adhesive applicator which coats a panel substrate with adhesive;

a first edge support member and a second edge support member located adjacent an outlet end of the adhesive applicator such that opposed edges of the panel substrate are respectively supported by the first edge support member and the second edge support member without interfering with the adhesive being applied to the panel substrate; and a support for selectively supporting the coated panel substrate and releasing the panel substrate so as not to interfere with the adhesive applied to the panel substrate by the adhesive applicator, the support including a release support lip adapted for supporting a leading edge of the panel substrate, which leading edge is substantially transverse to the opposed edges, as the panel substrate exits the outlet end of the adhesive applicator, the release support lip moving longitudinally with the panel substrate as the panel substrate moves from the outlet end of the adhesive applicator to guide the substrate panel for subsequent release upon a lower support surface.

20. The apparatus according to claim 19, wherein the release support lip selectively rotates to release the panel substrate.

* * * * *